(12) United States Patent
Fabian et al.

(10) Patent No.: US 7,715,675 B2
(45) Date of Patent: May 11, 2010

(54) OPTICAL FIBER COATING SYSTEM AND COATED OPTICAL FIBER

(75) Inventors: Michelle D Fabian, Horseheads, NY (US); Edward J Fewkes, Horseheads, NY (US); Huan-Hung Sheng, Charlotte, NC (US); Michael J Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 983 days.

(21) Appl. No.: 10/840,454

(22) Filed: May 5, 2004

(65) Prior Publication Data

US 2005/0031283 A1    Feb. 10, 2005

Related U.S. Application Data

(60) Provisional application No. 60/488,511, filed on Jul. 18, 2003.

(51) Int. Cl.
*G02B 6/036* (2006.01)
*G02B 6/44* (2006.01)

(52) U.S. Cl. .............. 385/128; 385/100; 385/123

(58) Field of Classification Search .......... 385/100, 385/102, 103, 107, 108, 123–128
See application file for complete search history.

(56) References Cited

U.S. PATENT DOCUMENTS

| 4,474,830 A | 10/1984 | Taylor | 427/54.1 |
| 4,514,037 A | 4/1985 | Bishop et al. | 350/96.23 |
| 4,581,165 A | 4/1986 | Frank et al. | 260/112.5 |
| 4,609,718 A | 9/1986 | Bishop et al. | 528/49 |
| 4,629,287 A | 12/1986 | Bishop | 350/96.34 |
| 4,682,851 A | 7/1987 | Ansel | 350/96.34 |
| 4,798,852 A | 1/1989 | Zimmerman et al. | 522/96 |
| 4,962,992 A | 10/1990 | Chapin et al. | 350/96.23 |
| 5,093,386 A | 3/1992 | Bishop et al. | 522/96 |
| 5,104,433 A | 4/1992 | Chapin et al. | 65/3.1 |
| 5,388,175 A | 2/1995 | Clarke | 385/100 |
| 5,408,564 A | 4/1995 | Mills | 385/128 |

(Continued)

FOREIGN PATENT DOCUMENTS

WO    WO99/10443    3/1999

(Continued)

OTHER PUBLICATIONS

U.S. Appl. No. 10/326,022, filed Dec. 19, 2002, entitled "Optical Tube Assembly Having a Dry Insert and Methods of Making the Same".

(Continued)

*Primary Examiner*—Uyen-Chau N Le
*Assistant Examiner*—John M Bedtelyon
(74) *Attorney, Agent, or Firm*—James V. Suggs; Robert L. Carlson

(57) ABSTRACT

The present invention relates to optical fiber coating systems capable of providing a high degree of microbend protection to an optical fiber, and an optical fiber coated therewith. According to one embodiment of the invention, an optical fiber coating system includes a primary coating and a secondary coating, wherein when a ribbon having twelve large effective area optical fibers coated with the coating system is subjected to the ribbon optical performance test at a wavelength of 1550 nm, the average change in attenuation is about 0.020 dB/km or less.

16 Claims, 3 Drawing Sheets

U.S. PATENT DOCUMENTS

| | | | | |
|---|---|---|---|---|
| 5,442,722 | A | 8/1995 | DeCarlo | 385/114 |
| 5,527,835 | A | 6/1996 | Shustack | 522/42 |
| 5,639,846 | A | 6/1997 | Shustack | 528/44 |
| 5,744,514 | A | 4/1998 | Shustack | 522/42 |
| 5,768,460 | A | 6/1998 | Levi et al. | 385/114 |
| 5,837,750 | A | 11/1998 | Szum et al. | 522/81 |
| 5,908,484 | A | 6/1999 | Decker et al. | 65/377 |
| 5,917,978 | A | 6/1999 | Rutterman | 385/109 |
| 5,970,196 | A | 10/1999 | Greveling et al. | 385/114 |
| 6,014,487 | A | 1/2000 | Field et al. | 385/110 |
| 6,014,488 | A | 1/2000 | Shustack | 385/128 |
| 6,057,034 | A | 5/2000 | Yamazaki et al. | 428/378 |
| 6,064,789 | A | 5/2000 | Mills | 385/114 |
| 6,075,065 | A | 6/2000 | Yamazaki et al. | 522/64 |
| 6,101,305 | A | 8/2000 | Wagman et al. | 385/113 |
| 6,110,593 | A | 8/2000 | Szum et al. | 428/383 |
| 6,136,880 | A | 10/2000 | Snowwhite et al. | 522/64 |
| 6,192,178 | B1 | 2/2001 | Logan et al. | 385/109 |
| 6,195,486 | B1 | 2/2001 | Field et al. | 385/100 |
| 6,215,934 | B1 | 4/2001 | Aloisio, Jr. et al. | 385/128 |
| 6,243,523 | B1 | 6/2001 | Aloisio et al. | 385/128 |
| 6,249,629 | B1 | 6/2001 | Bringuier | 385/113 |
| 6,253,013 | B1 | 6/2001 | Lochkovic et al. | 385/114 |
| 6,256,438 | B1 | 7/2001 | Gimblet | 385/109 |
| 6,289,158 | B1 | 9/2001 | Blyler et al. | 385/128 |
| 6,298,189 | B1 | 10/2001 | Szum et al. | 385/128 |
| 6,304,701 | B1 | 10/2001 | Bringuier et al. | 385/106 |
| 6,316,516 | B1 | 11/2001 | Chien et al. | 522/91 |
| 6,326,416 | B1 | 12/2001 | Chien et al. | 522/91 |
| 6,356,690 | B1 | 3/2002 | McAlpine et al. | 385/109 |
| 6,360,044 | B1 | 3/2002 | Mills et al. | 385/114 |
| 6,363,192 | B1 | 3/2002 | Spooner | 385/101 |
| 6,370,304 | B1 | 4/2002 | Mills et al. | 385/114 |
| 6,374,023 | B1 | 4/2002 | Parris | 385/109 |
| 6,389,204 | B1 | 5/2002 | Hurley | 385/102 |
| 6,449,412 | B1 | 9/2002 | Rutterman et al. | 385/103 |
| 6,463,199 | B1 | 10/2002 | Quinn et al. | 385/109 |
| 6,472,450 | B2 | 10/2002 | Szum et al. | 522/81 |
| 6,501,887 | B1 | 12/2002 | Bringuier et al. | 385/109 |
| 6,519,399 | B2 | 2/2003 | Strong et al. | 385/114 |
| 6,528,553 | B1 | 3/2003 | Komiya et al. | 522/96 |
| 6,531,522 | B1 | 3/2003 | Winningham | 522/96 |
| 6,534,557 | B2 | 3/2003 | Szum et al. | 522/90 |
| 6,539,152 | B1 | 3/2003 | Fewkes et al. | 385/114 |
| 6,553,167 | B2 | 4/2003 | Hurley et al. | 385/102 |
| 6,553,169 | B2 | 4/2003 | Fabian | 385/128 |
| 6,559,197 | B2 | 5/2003 | Fewkes et al. | 522/172 |
| 6,563,996 | B1 | 5/2003 | Winningham | 385/128 |
| 6,579,618 | B1 | 6/2003 | Ishikawa et al. | 428/378 |
| 6,602,601 | B2 | 8/2003 | Fewkes et al. | 428/378 |
| 6,611,647 | B2 * | 8/2003 | Berkey et al. | 385/123 |
| 6,621,965 | B2 | 9/2003 | Seddon et al. | 385/111 |
| 6,621,966 | B2 | 9/2003 | Lail | 385/114 |
| 6,628,875 | B2 | 9/2003 | Baker et al. | 385/128 |
| 6,661,956 | B2 | 12/2003 | Yamasaki et al. | 385/109 |
| 6,690,867 | B2 | 2/2004 | Melton et al. | 385/114 |
| 6,714,713 | B2 | 3/2004 | Lanier et al. | 385/128 |
| 6,731,844 | B2 | 5/2004 | Conrad et al. | 385/114 |
| 6,760,527 | B2 * | 7/2004 | Berkey et al. | 385/123 |
| 6,804,442 | B1 * | 10/2004 | Watanabe et al. | 385/128 |
| 6,849,333 | B2 * | 2/2005 | Schissel et al. | 428/392 |
| 6,862,392 | B2 * | 3/2005 | Fabian et al. | 385/128 |
| 2002/0009272 | A1 | 1/2002 | Parris | 385/109 |
| 2002/0102078 | A1 | 8/2002 | Bringuier et al. | 385/102 |
| 2002/0102079 | A1 | 8/2002 | Lail et al. | 385/114 |
| 2002/0102086 | A1 | 8/2002 | Fewkes et al. | 385/128 |
| 2002/0146225 | A1 | 10/2002 | Bulters et al. | 385/125 |
| 2002/0197030 | A1 | 12/2002 | McAlpine et al. | 385/103 |
| 2002/0197040 | A1 | 12/2002 | Takahashi et al. | 385/128 |
| 2003/0016923 | A1 | 1/2003 | Summers et al. | 385/100 |
| 2003/0018122 | A1 | 1/2003 | Bishop et al. | 524/589 |
| 2003/0049446 | A1 | 3/2003 | Schissel et al. | 428/375 |
| 2003/0059188 | A1 | 3/2003 | Baker et al. | 385/128 |
| 2003/0077059 | A1 | 4/2003 | Chien et al. | 385/128 |
| 2003/0091307 | A1 | 5/2003 | Hurley et al. | 385/109 |
| 2003/0095770 | A1 | 5/2003 | Fewkes et al. | 385/128 |
| 2003/0100627 | A1 | 5/2003 | Bishop et al. | 522/153 |
| 2003/0108612 | A1 | 6/2003 | Xu et al. | 424/489 |
| 2003/0118295 | A1 | 6/2003 | Lail et al. | 385/101 |
| 2003/0118299 | A1 | 6/2003 | Seddon et al. | 385/111 |
| 2003/0118301 | A1 | 6/2003 | Hurley et al. | 385/114 |
| 2003/0123839 | A1 * | 7/2003 | Chou et al. | 385/145 |
| 2003/0128941 | A1 | 7/2003 | Lanier et al. | 385/100 |
| 2003/0185529 | A1 | 10/2003 | Register, III et al. | 385/114 |
| 2003/0223713 | A1 | 12/2003 | Chiasson et al. | 385/114 |
| 2003/0223714 | A1 | 12/2003 | Conrad et al. | 385/114 |
| 2004/0022504 | A1 | 2/2004 | Hurley et al. | 385/109 |
| 2004/0086242 | A1 | 5/2004 | McAlpine et al. | 385/102 |

FOREIGN PATENT DOCUMENTS

| | | |
|---|---|---|
| WO | WO01/05724 | 1/2001 |
| WO | WO01/49624 | 7/2001 |
| WO | WO01/83393 | 11/2001 |
| WO | WO02/26854 | 4/2002 |
| WO | WO02/055447 | 7/2002 |
| WO | WO03/011938 | 2/2003 |
| WO | WO03/091177 | 11/2003 |
| WO | WO03/091178 | 11/2003 |
| WO | WO03/091346 | 11/2003 |
| WO | WO03/091781 | 11/2003 |

OTHER PUBLICATIONS

U.S. Appl. No. 10/325,539, filed Dec. 20, 2002, entitled "Optical Fiber Ribbon Having a Semi-Solid Film on the Outer Surface Thereof".

U.S. Appl. No. 10/328,507, filed Dec. 24, 2002, entitled "Allocation of Optical Fibers for Parameter Managed Cables and Cable Systems".

U.S. Appl. No. 10/376,786, filed Feb. 28, 2003, entitled "Optical Fiber Ribbons Having Preferential Tear Portions".

U.S. Appl. No. 10/403,327, filed Mar. 31, 2003, entitled "Fiber Optic Assemblies and Cables Having a Security Feature".

U.S. Appl. No. 10/448,509, filed May 30, 2003, entitled "Dry Tube Fiber Optic Assemblies, Cables, and Manufacturing Methods Therefor".

U.S. Appl. No. 10/448,874, filed May 30, 2003, entitled "Fiber Optic Cable Having a Binder".

U.S. Appl. No. 10/454,984 entitled "Coated Optical Fiber, Method for Making Coated Optical Fiber, and Curable Compositions for Coating Optical Fiber", filed Jun. 4, 2003.

U.S. Appl. No. 09/722,895 entitled "Secondary Coating Compensation for Optical Fibers", filed Nov. 27, 2000.

U.S. Appl. No. 10/623,219 entitled "Fiber Optic Articles, Assemblies and Cables Having Optical Waveguides", filed Jul. 18, 2003.

* cited by examiner

OPTICAL FIBER COATING SYSTEM AND COATED OPTICAL FIBER

CROSS-REFERENCE TO RELATED APPLICATIONS

This application claims the benefit of, and priority to U.S. Provisional Patent Application No. 60/488,511 filed on Jul. 18, 2003.

BACKGROUND OF THE INVENTION

1. Field of the Invention

The present invention relates generally to optical fiber, and more particularly to coating systems for optical fiber and coated optical fibers.

2. Technical Background

Optical fiber has acquired an increasingly important role in the field of telecommunications, frequently replacing existing copper wires. This trend has had a significant impact in all areas of telecommunications, greatly increasing the amount of data that is transmitted. Further increase in the use of optical fiber is foreseen, especially in metro and fiber-to-the-home applications, as local fiber networks are pushed to deliver an ever-increasing volume of audio, video, and data signals to residential and commercial customers. In addition, use of fiber in home and commercial premise networks for internal data, audio, and video communications has begun, and is expected to increase.

Optical fiber is typically made of glass, and usually has a polymeric primary coating and a polymeric secondary coating. The primary coating (also known as an inner primary coating), is typically applied directly to the glass fiber, and when cured forms a soft, elastic, compliant material encapsulating the glass fiber. The primary coating serves as a buffer to cushion and protect the glass fiber during bending, cabling or spooling. The secondary coating (also known as an outer primary coating) is applied over the primary coating, and functions as a tough, protective outer layer that prevents damage to the glass fiber during processing, handling and use.

The secondary coatings conventionally used in optical fibers are typically crosslinked polymers formed by curing a mixture of an oligomer (e.g., a urethane (meth)acrylate) and at least one monomer (e.g., a (meth)acrylate monomer). Generally, a high Young's modulus is desired in order to provide increased hardness of the protective material. However, an increase in Young's modulus generally serves to increase the brittleness of the material, making it more likely to fracture during use. As such, current optical fiber secondary coatings tend to have lower than desirable Young's moduli in order to ensure the necessary fracture toughness.

Microbending can be source of significant attenuation in conventional coated optical fibers. Microbending is conventionally thought of as being due to microscopic, but sharp curvatures in the optical fiber, which causes coupling between the guided mode with cladding and/or radiation modes. Microbending may be caused by packaging or deployment processes. The coating systems used in conventional coated optical fibers do not provide sufficient protection against microbending losses.

SUMMARY OF THE INVENTION

One embodiment of the present invention relates to an optical fiber coating system including a primary coating; and a secondary coating, wherein when a ribbon having twelve large effective area optical fibers coated with the coating system is subjected to the ribbon optical performance test at a wavelength of 1550 nm, the average change in attenuation is about 0.20 dB/km or less.

Another embodiment of the present invention relates to an optical fiber coating system including a primary coating; and a secondary coating, wherein when a ribbon having twelve multi-mode optical fibers coated with the coating system is subjected to the ribbon optical performance test at a wavelength of 850 nm, the average change in attenuation is about 0.20 dB/km or less.

Another embodiment of the present invention relates to an optical fiber coating system including a primary coating; and a secondary coating, wherein when the coating system is applied to a large effective area optical fiber having a mode field diameter of between about 9.64 µm and 9.94 µm at 1550 nm, the coated optical fiber formed thereby has a microbending loss less than 0.9 dB/km/% strain at a wavelength of 1550 nm as measured by the Expandable Drum test.

The coated optical fibers and coating systems of the present invention result in a number of advantages over prior art devices and methods. The coated optical fibers of the present invention may have low microbending losses. The optical fibers of the present invention may have secondary coatings with high Young's moduli, and are therefore well-protected from environmental abuse and exhibit reduced sensitivity to microbending. Simultaneously, the optical fibers of the present invention may exhibit improved handleability due to the high fracture toughness of the secondary coating.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
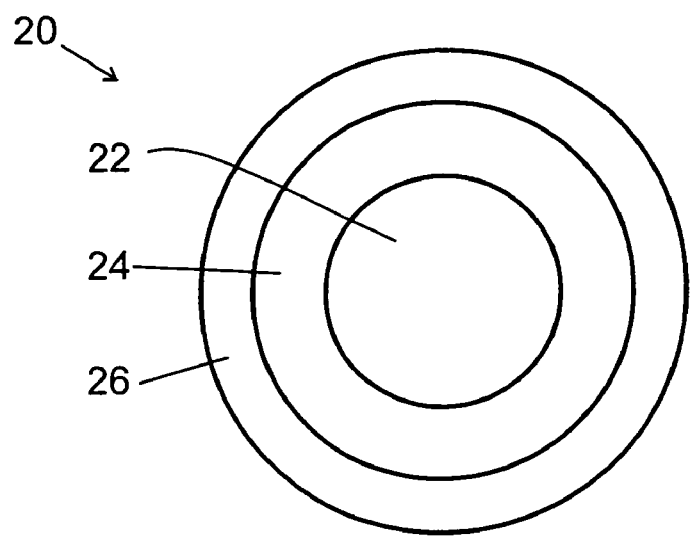
FIG. 1 is a schematic view of a coated optical fiber according one embodiment of the present invention.

One embodiment of the present invention relates to a coated optical fiber. An example of a coated optical fiber is shown in schematic cross-sectional view in FIG. 1. Coated optical fiber 20 includes an optical fiber 22, a primary coating 24 encapsulating the optical fiber, and a secondary coating 26 encapsulating the primary coating. In the coated optical fiber of FIG. 1, the primary coating is applied directly to the surface of the optical fiber, and the secondary coating is applied directly to the surface of the primary coating. As the skilled artisan will appreciate, in alternative embodiments of the invention, a thin (e.g., less than 10 μm in thickness) layer of another coating may be formed between the optical fiber and the primary coating, and/or between the primary coating and the secondary coating.

The optical fiber 22 is an uncoated optical fiber including a core and a cladding, as is familiar to the skilled artisan. The uncoated optical fiber may be a single mode fiber or a multi-mode fiber. The optical fiber may be adapted for use as a data transmission fiber (e.g., SMF-28®, LEAF®, and METRO-COR®, each of which is available from Corning Incorporated of Corning, N.Y.). Alternatively, the optical fiber may perform an amplification, dispersion compensation, or polarization maintenance function, or may be used in short lengths in coupling optical devices. The skilled artisan will appreciate that the coatings described herein are suitable for use with virtually any optical fiber for which protection from the environment is desired.

In coated optical fiber 20, optical fiber 22 is surrounded by a primary coating 24. Primary coating 24 desirably has a Young's modulus of about 1.3 MPa or less. Desirably, the primary coating has a Young's modulus of about 1.25 MPa or less. More desirably, the primary coating has a Young's modulus of about 1.15 MPa or less. In certain especially desirable embodiments of the present invention, the primary coating has a Young's modulus of about 1 MPa or less. Desirably, the primary coating has a tensile strength of about 0.5 MPa or greater. As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 μm) and 0.004" (102 μm) in thickness and about 1.3 cm in width, with a gauge length of 5.1 cm, and a test speed of 2.5 cm/min.

Primary coating 24 desirably has a glass transition temperature lower than the lowest projected use temperature of the coated optical fiber. For example, the primary coating desirably has a glass transition temperature less than about −10° C. In especially desirable embodiments of the invention, the primary coating has a glass transition temperature of about −20° C. or less. Primary coating 24 desirably has a higher refractive index than the cladding of the optical fiber in order to allow it to strip errant optical signals away from the core of optical fiber 22. In a typical optical fiber used for long-distance transmission of optical signals, the refractive index values at a wavelength of 1550 nm for the core and cladding are 1.447 and 1.436, respectively; as such, it is desirable that the refractive index of primary coating be greater than 1.44 at 1550 nm. The primary coating should maintain adequate adhesion to the glass fiber during thermal and hydrolytic aging, yet be strippable therefrom for splicing purposes. The primary coating typically has a thickness in the range of 25-50 μm (e.g., about 32.5 μm). Primary coatings are typically applied to the optical fiber as a liquid and cured, as will be described in more detail hereinbelow.

The polymeric materials used as the primary coatings in the present invention may be the cured product of a primary curable composition including an oligomer and at least one monomer. As is conventional, the primary curable compositions used in forming the primary coatings may also include photoinitiators, antioxidants, and other additives familiar to the skilled artisan. In desirable embodiments of the invention, the oligomer and monomers of the primary curable composition are ethylenically unsaturated. In especially desirable embodiments of the invention, the oligomer and monomers of the primary curable composition are (meth)acrylate-based. The oligomer may be, for example, a urethane (meth)acrylate oligomer. However, as the skilled artisan will recognize, oligomers and monomers adapted for other curing chemistries, such as epoxy, vinyl ether, and thiol-ene, may be used in accordance with the present invention.

Desirable acrylate-terminated oligomers for use in the primary curable compositions include BR3731 and BR3741, available from Bomar Specialty Co.; polyether urethane acrylate oligomers (e.g., CN986, available from Sartomer Company); polyester urethane acrylate oligomers (e.g., CN966 and CN973, available from Sartomer Company; and BR7432, available from Bomar Specialty Co.); polyether acrylate oligomers (e.g., GENOMER 3456, available from Rahn AG); polyester acrylate oligomers (e.g., EBECRYL 80, 584 and 657, available from UCB Radcure); epoxy acrylate oligomers (e.g., CN120, available from Sartomer Company, and EBECRYL 3201 and 3604, available from UCB Radcure), hydrogenated polybutadiene oligomers (e.g., ECHO RESIN MBNX available from Echo Resins and Laboratory). Other oligomers are described in U.S. Pat. Nos. 4,609,718; 4,629,287; and 4,798,852, each of which is incorporated herein by reference. The above described oligomers may be used singly, or in combination, as the skilled artisan would readily appreciate. The oligomer of the primary curable composition is desirably selected to provide the primary coating with the desired glass transition temperature and tensile properties. One type of desirable oligomer for use in the primary curable composition is an oligomer having a soft block having Mn of about 4000 Daltons or greater. Examples of such oligomers are described in U.S. Patent Publication Number 2003/0123839, which is incorporated herein by reference in its entirety. Oligomers that are especially desirable for use in the primary coating compositions of the present invention have flexible backbones, low polydispersities, and yield low crosslink densities in cured compositions.

The total oligomer content of the primary curable composition may be between about 5 wt % and about 95 wt %. Desirably, the total oligomer content of the primary curable composition is between about 25 wt % and about 75 wt %. In certain embodiments of the invention, the oligomer content of the primary curable composition is between about 40 wt % and about 60 wt %.

The monomer component of the primary curable composition is generally selected to be compatible with the oligomer, to provide a low viscosity formulation, and to increase the refractive index of the primary coating. One group of suitable monomers includes

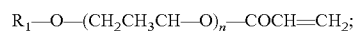

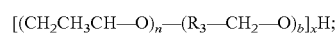

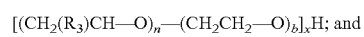  and

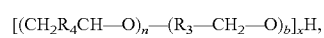

where $R_1$ and $R_2$ are aliphatic or aromatic or mixtures of both; n=1 to 10; $R_3$ and $R_4$ are alkyl or alkylene oxide group which can be acrylated to provide mono- or multifunctional acrylates. The coefficients "a", "b", and "x" can be any positive whole integer. Desirably, each co-monomer includes at least one n-propyl, isopropyl, or substituted isopropyl group. Examples of a monomer with a substituted isopropyl group are shown below:

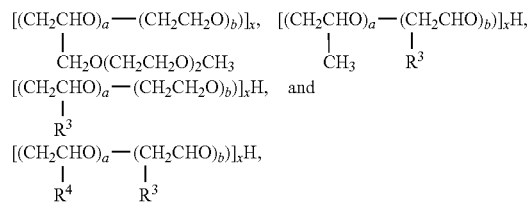

where $R^3$ and $R^4$ are alkyl, alkyl oxide, or alkylene oxide groups that can be acrylated to provide mono- or multifunctional acrylates.

Other suitable monomers include ethoxylated acrylates, ethoxylated alkylphenol monoacrylates, propylene oxide acrylates, n-propylene oxide acrylates, iso-propylene oxide acrylates, monofunctional acrylates, multifunctional acrylates, and combinations thereof. Especially preferred monomers include $R_2$—$R_1$—O—(CH$_2$CH$_3$CH—O)$_n$—COCH═CH$_2$, where $R_1$ and $R_2$ are aliphatic, aromatic, or a mixture of both, and n=1 to 10, and $R_1$—O—(CH$_2$CH$_3$CH—O)$_n$—COCH═CH$_2$, where $R_1$ is aliphatic or aromatic, and n=1 to 10. Specific examples include ethylenically unsaturated monomers including lauryl acrylate (e.g., SR335 available from Sartomer Company, Inc., AGEFLEX FA12 available from CPS Chemical Co. (Old Bridge, N.J.), and PHOTOMER 4812 available from Cognis (Ambler, Pa.)), ethoxylated nonylphenol acrylate (e.g., SR504 available from Sartomer Company, Inc. and PHOTOMER 4003 available from Cognis), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from CPS Chemical Co., and PHOTOMER 4035 available from Cognis), isooctyl acrylate (e.g., SR440 available from Sartomer Company, Inc. and AGEFLEX FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN 130 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

The skilled artisan will recognize that monomers may be used alone or in combination. In some cases, when multiple types of monomers are used, one monomer is chosen for its ability to dissolve the polymer and a second monomer may be chosen for its ability to achieve a desired rate of cure. When a single monomer is desired, preferably the monomer is chosen for its ability to dissolve the oligomer.

In certain embodiments of the invention, it may be desirable to use a hydroxyfunctional monomer in the primary curable composition. A hydroxyfunctional monomer is a monomer that has a pendant hydroxy moiety in addition to an oligomer-reactive functionality (e.g., acrylate). Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth)acrylate, 3-hydroxypropyl (meth)acrylate, and 4-hydroxybutyl (meth) acrylate (each available from Aldrich). The hydroxyfunctional monomer is desirably present in an amount sufficient to improve adhesion of the primary coating to the optical fiber. For example, the hydroxyfunctional monomer may be present in an amount between about 0.1 wt % and about 25 wt % of the primary curable composition. In certain desirable embodiments of the invention, the hydroxyfunctional monomer is present in an amount between about 0.5 wt % and about 8 wt % of the primary curable composition. The use of the hydroxyfunctional monomer may decrease the amount of adhesion promoter necessary for adequate adhesion of the primary coating to the optical fiber. Hydroxyfunctional monomers are described in more detail in U.S. Pat. No. 6,563,996, which is incorporated herein by reference.

The total monomer content of the primary curable composition may be between about 5 wt % and about 95 wt %. Desirably, the total monomer content of the primary curable composition is between about 25 wt % and about 65 wt %. In certain embodiments of the invention, the monomer content of the primary curable composition is between about 35 wt % and about 55 wt %.

Through variation of the oligomers, and the polyols from which they are based, coatings of desired $T_g$, modulus, elongation, and the like can be prepared in accordance with the present disclosure. The mechanical properties of these coatings can be adjusted by the choice of the oligomer and the monomer component. In order to provide coating formulations with a viscosity that is in a range suitable for processing, the viscous oligomers may be diluted with low viscosity, radiation curable monomers with which the oligomers are compatible.

In addition, according to the Fox equation, the ultimate glass transition temperature of a cured coating will be a function of the glass transition temperatures of the components of the coating formulation from which it is made. Thus, a desirable monomer in an optical fiber coating would be a low viscosity material with a low homopolymer glass transition temperature, which can readily dissolve the oligomer and which does not negatively impact the mechanical properties of the cured coating. In addition to low $T_g$ and suitable viscosity, the selection of the oligomer and monomer combinations may be influenced by other desirably properties for optical fibers. These additional properties include suitably high refractive index, good optical clarity, good resistance to water sensitivity under humid conditions, low water and oil sensitivity, high thermal and light resistance, low extractable content, and fast cure.

The primary curable composition may also contain a polymerization initiator which is suitable to cause polymerization (i.e., curing) of the composition after its application to an fiber. Polymerization initiators suitable for use in the primary curable compositions of the present invention include thermal initiators, chemical initiators, electron beam initiators, and photoinitiators. Particularly preferred are the photoinitiators. For most acrylate-based coating formulations, conventional photoinitiators, such as ketonic photoinitiating and/or phosphine oxide additives, are preferred. When used in the compositions of the present invention, the photoinitiator is present in an amount sufficient to provide rapid ultraviolet curing.

Suitable photoinitiators include 1-hydroxycyclohexylphenyl ketone (e.g., IRGACURE 184 available from Ciba Specialty Chemical (Hawthorne, N.Y.); bis(2,6-dimethoxybenzoyl)-2,4,4-trimethylpentylphosphine oxide (e.g., commercial blends IRGACURE 1800, 1850, and 1700 available from Ciba Specialty Chemical); 2,2-dimethoxy-2-phenylacetophenone (e.g., IRGACURE 651, available from Ciba Specialty Chemical); bis(2,4,6-trimethylbenzoyl)phenylphosphine oxide (IRGACURE 819); (2,4,6-trimethylbenzoyl)diphenyl phosphine oxide (LUCERIN TPO, available from BASF (Munich, Germany)); ethoxy(2,4,6-trimethylbenzoyl)phenylphosphine oxide (LUCERIN TPO-L from BASF); and combinations thereof.

The total photoinitiator content of the primary curable composition may be up to about 10 wt %. Desirably, the total photoinitiator content of the primary curable composition is between about 0.5 wt % and about 6 wt %. The photoinitiator component of the primary curable composition may consist of a single photoinitiator; alternatively, two or more photoinitiators may be combined to lend a desired curing property to the curable composition. For example, a combination of IRGACURE 819 and IRGACURE 184 may be used to ensure adequate surface cure as well as complete cure of the bulk primary coating material.

The photoinitiator, when used in a small but effective amount to promote radiation cure, provides reasonable cure speed without causing premature gelation of the coating composition. A desirable cure speed is any speed sufficient to cause substantial curing of the coating materials. A preferred dosage for coating thicknesses of about 25-35 μm is, for example, less than about 1.0 J/cm$^2$, preferably less than about 0.5 J/cm$^2$.

As used herein, the weight percent of a particular component refers to the amount introduced into the bulk curable composition excluding an additional adhesion promoter and other additives. The amount of additional adhesion promoter and various other additives that are introduced into the curable composition to produce a composition of the present invention is listed in parts per hundred. For example, a monomer, oligomer, and photoinitiator are combined to form the curable composition such that the total weight percent of these components equals 100 percent. To this bulk curable composition, an amount of an additional adhesion promoter, for example 1.0 part per hundred, can be employed in excess of the 100 weight percent of the bulk composition.

It may be desirable to include an adhesion promoter in the primary curable composition. In a preferred embodiment, an adhesion promoter is present in the primary curable composition in an amount between about 0.02 to about 10 parts per hundred, more preferably between about 0.05 to about 4 parts per hundred, most preferably between about 0.1 to about 2 parts per hundred. In certain embodiments of the present invention, the adhesion promoter is present in an amount of about 0.1 to about 0.75 pph. Suitable adhesion promoters include alkoxysilanes, organotitanates, and zirconates. Preferred adhesion promoters include 3-mercaptopropyltrialkoxysilane (e.g., 3-MPTMS, available from United Chemical Technologies (Bristol, Pa.)), bis(trialkoxysilylethyl) benzene, acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from Gelest (Tullytown, Pa.)); see U.S. Pat. No. 6,316,516, which is hereby incorporated by reference in its entirety.

The skilled artisan may use other conventional adhesion promoters in the primary curable compositions used in the present invention.

In addition to the above-described components, the primary curable composition of the present invention can optionally include any number of additives, such as reactive diluents, antioxidants, catalysts, and other stabilizers and property-enhancing additives. Some additives can operate to control the polymerization process, thereby affecting the physical properties (e.g., modulus, glass transition temperature) of the polymerization product formed from the primary curable composition. Others can affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, each of which is hereby incorporated herein by reference.

The primary coating composition may also include a strength additive, as described in U.S. Publication Number 2003/0077059, which is hereby incorporated herein by reference in its entirety. Desirable strength additives include mercapto-functional compounds, such as N-(tert-butoxycarbonyl)-L-cysteine methyl ester; pentaerythritol tetrakis(3-mercaptopropionate); (3-mercaptopropyl)-trimethoxysilane; (3-mercaptopropyl)trimethoxysilane; and dodecyl mercaptan. The strength additive is desirably present in the primary curable composition in an amount less than about 1 pph. More desirably, the strength additive is present in the primary curable composition in an amount less than about 0.5 pph. In certain embodiments of the invention, the strength additive is present in the primary curable composition in an amount between about 0.01 pph and about 0.1 pph.

A preferred antioxidant is thiodiethylene bis(3,5-di-tert-butyl)-4-hydroxyhydrocinnamate) (e.g., IRGANOX 1035, available from Ciba Specialty Chemical).

The composition can further include additional additives such as waxes, lubricants, slip agents, as well as other additives known in the art.

In coated optical fiber 20 of FIG. 1, primary coating 24 is surrounded by secondary coating 26. While in FIG. 1, the secondary coating is shown as being applied directly to the primary coating, the skilled artisan will recognize that in alternative embodiments of the invention there may be one or more intermediate coating layers deposited between the primary coating and the secondary coating. Secondary coating 26 is formed from a cured polymeric material, and typically has a thickness in the range of 20-35 μm (e.g., about 27.5 μm). The secondary coating desirably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has adequate adhesion to the coating to which it is applied (e.g., the primary coating).

Figure 2:
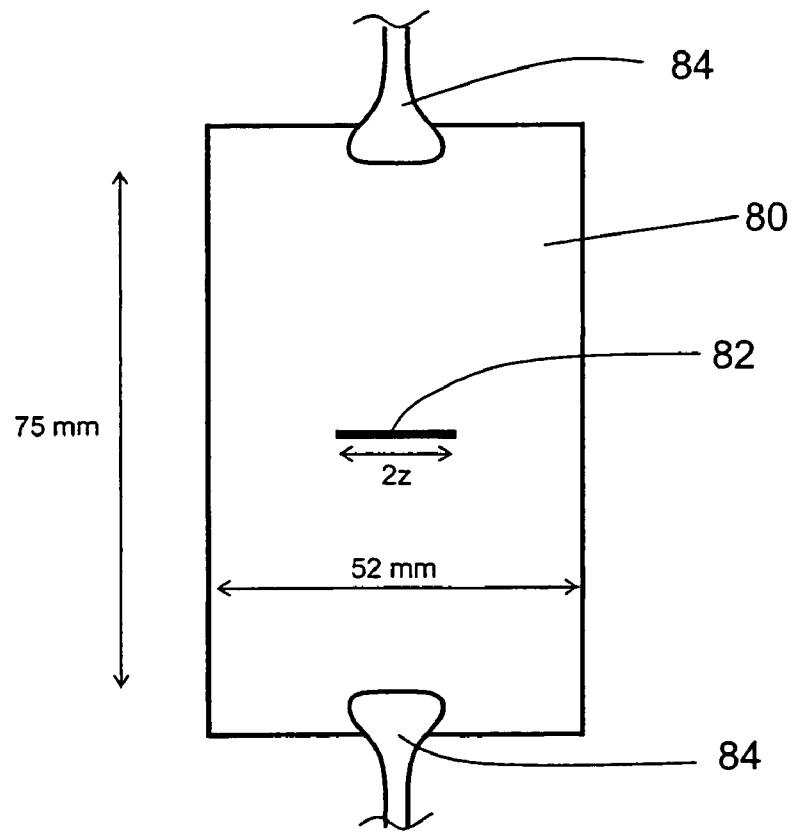
FIG. 2 is a schematic view of a film sample used to measure fracture toughness.

The resistance of a material to unstable, catastrophic crack growth is described by the material property known as fracture toughness, $K_{1C}$. The fracture toughness of a material relates to the amount of energy required to propagate a crack in the material. As used herein, fracture toughness $K_{1C}$ is measured on film samples, and is defined as $Y\sigma\sqrt{z}$, where Y is a geometry factor, σ is the tensile strength (at break) of the film sample, and z is half of the notch length. Fracture toughness is measured on films having a center cut notch geometry. FIG. 2 is a schematic depiction of the sample geometry used in measuring fracture toughness. Film sample 80 has a width of about 52 mm, and is about 0.010" (254 μm) in thickness. A notch 82 having a length of 2z is cut in the center of the film using a sharp blade using methods familiar to the skilled artisan. Notches having lengths of 18 mm, 24 mm, and 30 mm are cut in different samples. The tensile strength (at break) of the sample, σ, is measured using a tensile testing instrument (e.g., a Sintech MTS Tensile Tester, or an Instron Universal Material Test System), as described above. The sample is gripped in the jaws 84 of the tensile testing instrument such that the gauge length is 7.5 cm. The displacement rate is 2.0 mm/min. The tensile strength may be calculated by dividing the applied load at break by the cross-sectional area of the intact sample. For the samples described above, the tensile strength may be calculated using the equation $$\sigma = \frac{\text{Load}}{254 \, \mu m (52 \text{ mm} - 2z)}.$$

Y is a geometry factor, and is defined as $1.77 - 0.177(2\lambda) + 1.77(2\lambda)^2$, where $\lambda = z/\text{sample width}$.

The sensitivity of the secondary coating to handling and to the formation of defects is reflected by its ductility. Ductility is defined by the equation $$\text{Ductility} = \left(\frac{K_{1C}}{\text{yield stress}}\right)^2.$$

Larger ductilities indicate reduced sensitivity of the secondary coating to defects. As used herein, the Young's modulus, elongation to break, and tensile strength of a secondary coating material is measured using a tensile testing instrument (e.g., a Sintech MTS Tensile Tester, or an Instron Universal Material Test System) on a sample of a material shaped as a cylindrical rod about 0.0225" (571.5 μm) in diameter, with a gauge length of 5.1 cm, and a test speed of 2.5 cm/min. Yield stress can be measured on the rod samples at the same time as the Young's modulus, elongation to break, and tensile strength, as described above. As is familiar to the skilled artisan, for samples that exhibit strain softening, the yield stress is determined by the first local maximum in the stress vs. strain curve. More generally, the yield stress can be determined using the method given in ASTM D638-02, which is incorporated herein by reference. Physical properties such as Young's modulus, elongation to break, tensile strength, and yield stress are determined as an average of at least five samples.

The secondary coating 26 of coated optical fiber 20 is formed from a cured polymeric material having a ductility of at least about 275 μm. In desirable embodiments of the present invention, the cured polymeric material of the secondary coating has a ductility of at least about 300 μm. In especially desirable embodiments of the present invention, the cured polymeric material of the secondary coating has a ductility of at least about 370 μm. In certain embodiments of the present invention, the cured polymeric material of the secondary coating has a ductility of at least about 450 μm. The cured polymeric material of secondary coating 26 of optical fiber 20 desirably has a fracture toughness of at least about 0.7 MPa·m$^{1/2}$. In certain embodiments of the invention, the cured polymeric material of the secondary coating has a fracture toughness of at least about 0.9 MPa·m$^{1/2}$. The cured polymeric material of the secondary coating 26 of coated optical fiber 20 desirably has a Young's modulus of greater than about 900 MPa. In desirable embodiments of the invention, the cured polymeric material of the secondary coating has a Young's modulus of at least about 1200 MPa. In especially desirable embodiments of the invention, the cured polymeric material of secondary coating 26 has a Young's modulus of at least about 1400 MPa.

The cured polymeric materials used in the secondary coatings of the optical fibers of the present invention may be the cured product of a secondary curable composition including an oligomer and at least one monomer. As is conventional, the secondary curable compositions used in forming the secondary coatings may also include photoinitiators, antioxidants, and other additives familiar to the skilled artisan. In desirable embodiments of the invention, the oligomer and monomers of the secondary curable composition are ethylenically unsaturated. In especially desirable embodiments of the invention, the oligomer and monomers of the secondary curable composition are (meth)acrylate-based. The oligomer may be, for example, a urethane (meth)acrylate oligomer. However, as the skilled artisan will recognize, oligomers and monomers adapted for other curing chemistries, such as epoxy, vinyl ether, and thiol-ene, may be used in accordance with the present invention.

Desirably, the oligomer of the curable composition is selected to provide a high ductility and a high Young's modulus to the cured polymeric material. The skilled artisan may use conventional or commercially available oligomers in the secondary curable compositions of the present invention. For example, the oligomer may be the capped product of the reaction of a dihydric polyether, polyester, or polycarbonate with an aliphatic or aromatic diisocyanate. When it is desirable to provide increased moisture resistance, the skilled artisan may use oligomers based on nonpolar diols, such as saturated aliphatic diols. Examples of commercially available oligomers suitable for use in the curable compositions of the present invention include BR301 and KWS4131 from Bomar Specialty Co.; RCC12-892 and RCC13-572 from Cognis Corp; PHOTOMER 6008 and 6010 from Cognis Corp; and EBECRYL 8800, 4883, 8804, 8807, 8402, and 284 from UCB Radcure. Further, in certain desirable embodiments of the invention, oligomers that have rigid polyol-derived subunits, multiple functionality, and/or crystallizable moieties are especially desirable for use in the secondary curable compositions of the present invention. Such oligomers, as well as secondary coatings prepared therefrom, are described in U.S. patent application Ser. No. 10/454,984, entitled "COATED OPTICAL FIBER, METHOD FOR MAKING COATED OPTICAL FIBER, AND CURABLE COMPOSITIONS FOR COATING OPTICAL FIBER," which is hereby incorporated herein by reference in its entirety.

The secondary curable compositions of the present invention also include one or more monomers having reactive termini selected to react with the reactive termini of the oligomer. In general, individual monomers capable of greater than about 80% conversion are more desirable than those having lower conversion rates. The degree to which monomers having low conversion rates can be introduced into the curable composition depends upon the particular requirements of the desired cured polymeric material. Typically, higher conversion rates will yield stronger cured products.

Suitable polyfunctional ethylenically unsaturated monomers for use in the curable compositions of the present invention include, without limitation, alkoxylated bisphenol A diacrylates such as ethoxylated bisphenol A diacrylate with ethoxylation being 2 or greater, preferably ranging from 2 to about 30, and propoxylated bisphenol A diacrylate with propoxylation being 2 or greater, preferably ranging from 2 to about 30 (e.g., PHOTOMER 4025 and PHOTOMER 4028, available from Cognis Corp. (Ambler, Pa.)); methylolpropane polyacrylates with and without alkoxylation such as ethoxylated trimethylolpropane triacrylate with ethoxylation being 3 or greater, preferably ranging from 3 to about 30 (e.g., PHOTOMER 4149, Cognis Corp., and SR499, Sartomer Company, Inc.), propoxylated trimethylolpropane triacrylate with propoxylation being 3 or greater, preferably ranging from 3 to 30 (e.g., PHOTOMER 4072, Cognis Corp.), and ditrimethylolpropane tetraacrylate (e.g., PHOTOMER 4355, Cognis Corp.); alkoxylated glyceryl triacrylates such as propoxylated glyceryl triacrylate with propoxylation being 3 or greater (e.g., PHOTOMER 4096, Cognis Corp.); erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), and dipentaerythritol pentaacrylate (e.g., PHOTOMER 4399, Cognis Corp., and SR399, Sartomer Company, Inc.); isocyanurate polyacrylates formed by reacting an appropriate cyanuric acid with an acrylic acid or acryloyl chloride, such as tris(2-hydroxyethyl) isocyanurate triacrylate (e.g., SR368, Sartomer Company, Inc.) and tris(2-hydroxyethyl) isocyanurate diacrylate; alcohol polyacrylates with and without alkoxylation such as cyclohexane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates such as those formed by adding acrylate to bisphenol A diglycidylether (e.g., PHOTOMER 3016, Cognis Corp.); and single and multi-ring cyclic aromatic or non-aromatic polyacrylates such as tricyclodecane dimethanol diacrylate, dicyclopentadiene diacrylate and dicyclopentane diacrylate. Bisphenol A-based monomers are especially desirable for use in the curable compositions of the present invention.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl acrylate, 2-hydroxypropyl acrylate, and 2-hydroxybutyl acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR506, Sartomer Company, Inc.), tetrahydrofurfuryl acrylate (e.g., SR285, Sartomer Company, Inc.) and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and caprolactone acrylate (e.g., SR495, Sartomer Company, Inc.); various alkoxylated alkylphenol acrylates such as ethoxylated (4) nonylphenol acrylate (e.g., PHOTOMER 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleates, fumarates, crotonates and vinyl esters.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

According to one embodiment of the present invention, the total oligomer content of the curable composition is less than about 25%. In especially desirable embodiments of the invention, the total oligomer content of the secondary curable composition is less than about 15%. In desirable embodiments of the present invention, the total monomer content of the secondary curable composition is greater than about 65%. In especially desirable embodiments of the invention, the monomer content of the secondary curable composition is greater than about 75%. Use of relatively low amounts of oligomer allows the skilled artisan to easily formulate curable compositions having a desirable viscosity. As the oligomer is typically a more expensive component of the composition, minimization of the amount of oligomer allows the skilled artisan to reduce the cost of the curable composition, as well as the cost of articles, such as optical fibers, coated therewith. Secondary curable compositions having low oligomer content are described in more detail in U.S. patent application Ser. No. 09/722,895, which is incorporated herein by reference in its entirety.

The secondary curable compositions of the present invention may also include a polymerization initiator. The initiator is desirably present in an amount effective to initiate polymerization of the curable composition. Desirable secondary curable compositions of the present invention are adapted to be cured by actinic radiation, and include one or more photoinitiators. For most (meth)acrylate-based curable compositions, conventional photoinitiators, such as ketonic and/or phosphine-oxide based initiators, may be used. Generally, the total photoinitiator content of the curable composition is between about 0.1 and about 10.0 weight percent. More desirably, the total photoinitiator content of the curable composition is between about 1.0 and about 7.5 weight percent. Suitable photoinitiators include, without limitation, 1-hydroxycyclohexylphenyl ketone (e.g., IRGACURE 184 available from Ciba Specialty Chemical (Tarrytown, N.Y.)), bis(2,6-dimethoxybenzoyl)-2,4,4-trimethylpentyl phosphine oxide (e.g., in commercial blends IRGACURE 1800, 1850, and 1700, Ciba Specialty Chemical), (2,4,6-trimethylbenzoyl)diphenyl phosphine oxide (e.g., LUCIRIN TPO, available from BASF), 2,2-dimethoxyl-2-phenyl acetophenone (e.g., IRGACURE 651, Ciba Specialty Chemical), bis(2,4,6-trimethylbenzoyl)phenyl phosphine oxide (e.g., IRGACURE 819, Ciba Specialty Chemical), 2-hydroxy-2-methyl-1-phenylpropane-1-one (e.g., in commercial blend DAROCUR 4265, Ciba Specialty Chemical) and combinations thereof. It may be desirable to use a combination of an α-hydroxy ketone photoinitiator (e.g., IRGACURE 184) with a bis(acyl) phosphine oxide or mono(acyl)phosphine oxide photoinitator (e.g., IRGACURE 819) to provide both adequate surface cure and adequate cure of the bulk material. Secondary curable compositions for use as secondary coatings in optical fibers may be formulated with a photoinitator having an absorption spectrum that does not completely overlap the absorption spectrum of the photoinitiator used in the primary curable composition, as is described in U.S. Pat. No. 6,628,875, which is incorporated herein by reference in its entirety. For example, the primary curable composition may include IRGACURE 819, and the secondary curable composition may include IRGACURE 184 and LUCIRIN TPO. Other photoinitiators are continually being developed and used in coating compositions on glass fibers. Any suitable photoinitiator can be introduced into compositions of the present invention.

In addition to the above-described components, the curable compositions of the present invention can optionally include an additive or a combination of additives. Suitable additives include, without limitation, antioxidants, catalysts, lubricants, low molecular weight non-crosslinking resins, adhesion promoters, coupling agents, coloring agents, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation). A desirable antioxidant is thiodiethylene bis(3,5-di-tert-butyl)-4-hydroxyhydrocinnamate, available as IRGANOX 1035 from Ciba Specialty Chemical). A suitable adhesion promoter is an acrylated acid adhesion promoter such as EBECRYL 170, available from UCB Radcure. Titanium and zirconium-based coupling agents and optical brighteners such as those described in U.S. Pat. Nos. 6,553,169 and 6,602,601, each of which is incorporated herein by reference in its entirety, may also be used in the curable compositions of the present invention. Optical brighteners such as UVITEX OB, available from Ciba may also be used in the curable compositions of the present invention.

Other suitable materials for use in secondary coating materials, as well as considerations related to selection of these materials, are well known in the art and are described in U.S. Pat. Nos. 4,962,992 and 5,104,433 to Chapin, which are hereby incorporated herein by reference. Various additives that enhance one or more properties of the coating can also be present, including the above-mentioned additives incorporated in the compositions of the present invention.

Another embodiment of the present invention relates to a method of making an optical fiber including the primary and secondary coatings described hereinabove. This method can generally be performed by standard methods with the use of a coating system of the present invention. Briefly, the process involves fabricating the glass fiber (using methods familiar to the skilled artisan), applying the primary curable composition to the glass fiber, polymerizing the primary curable composition to form the primary coating material, applying the secondary curable composition to the coated glass fiber, and polymerizing the secondary curable composition to form the cured polymeric material as the secondary coating of the optical fiber. Optionally, the secondary curable composition can be applied to the coated fiber before polymerizing the primary curable composition, in which case only a single polymerization step is employed.

The primary and secondary curable compositions are coated on an optical fiber using conventional processes, for example, on a draw tower. It is well known to draw glass optical fibers from a specially prepared, cylindrical preform which has been locally and symmetrically heated to a temperature, e.g., of about 2000° C. As the preform is heated, such as by feeding the preform into and through a furnace, a glass optical fiber is drawn from the molten material. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and uncured) coating composition on the glass fiber to ultraviolet light, actinic radiation, microwave radiation, or electron beam, depending upon the nature of the coating composition(s) and polymerization initiator being employed. It is frequently advantageous to apply both a primary curable composition and any secondary curable compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary curable composition can be applied and cured to form the primary coating material, then the secondary curable composition can be applied and cured to form the cured polymeric material of the secondary coating.

According to one embodiment of the invention, the coated optical fiber of FIG. 1 has a pullout value of between about 0.5 and about 4 pounds force. More desirably, the coated optical fiber has a pullout value of between about 1 and about 2.5 pounds force. As used herein, pullout is the peak force needed to pull a 1 cm length of the optical fiber out of the coating system. The pullout tests are based on FOTP-105, Recommended Standard EIA/TIA-455, and are described in more detail in the Examples below. Pullout has been used as a measure of the adhesion of the coating system to the optical fiber. As used herein, the pullout value is measured on an optical fiber at 50% relative humidity at a temperature of 23° C.

In another desirable embodiment of the invention, a coating system for optical fibers includes a primary coating and a secondary coating, wherein when the coating system is applied to a large effective area optical fiber having a mode field diameter of between about 9.64 µm and 9.94 µm at 1550 nm, the coated optical fiber formed thereby has a microbending loss less than 0.9 dB/km/% strain, desirably less than 0.6 dB/km/% strain, at a wavelength of 1550 nm as measured by the Expandable Drum test. The large effective area optical fiber used in the test is a non-zero dispersion shifted fiber having a total dispersion between 2 and 6 µs/(nm·km) over the wavelength range of 1530 to 1565 nm, and between 4.5 and 11.2 µs/(nm·km) over the wavelength range of 1565 to 1625 nm; a numerical aperture of about 0.14 as measured at the 1% power level of a one-dimensional far field scan at 1550 mm; and a cladding outer diameter of about 125 µm. Such an optical fiber is available as LEAF® from Corning Incorporated, Corning, N.Y. The primary coating is deposited on the exterior of the optical fiber cladding at a thickness of about 32.5 µm, and the secondary coating is deposited on the primary coating at a thickness of about 27.5 µm. Desirably, when the coating system is applied as described above to a large effective area optical fiber having a mode field diameter between 9.64 mm and 9.94 mm at 1550 nm, the coated optical fiber formed thereby has a microbending loss less than 2.3 dB/km/% strain, more desirably less than 1.5 dB/km/% strain, at a wavelength of 1625 nm as measured by the Expandable drum test.

The Expandable Drum test measures the slope of attenuation loss due to strain at different wavelengths of light. To perform the test, a length of fiber 750 m long is tension wound at 70 grams of tension in a single layer, with no crossovers on an expandable drum. The expandable drum surface is made from high impact polystyrene to prevent damage to the fiber and is free of scratches and contaminants that could cause premature microbending to occur. The expandable drum is a drum with an unexpanded diameter of 30 cm (55 cm in length) that can be expanded uniformly to apply strain to the fiber wound on the drum. Each time the drum diameter was increased the diameter was increased about 2 mm or less. The diameter of the drum was expanded four times during the testing procedure.

The drum includes a mechanism that will allow a user to controllably apply a strain to the fiber on the drum by increasing the diameter of the drum having fiber wound onto the drum. The increase in diameter of the drum is controlled by the movement of an expansion element. To expand the diameter of the drum, the expansion element is turned 90° in a clockwise direction. Each time the expansion element is turned 90° the drum diameter is expanded. As the drum expands, an elongation force is applied to the fiber. An example of the elongation force applied to a sample of SMF-28™ fiber, in terms of percent strain, is listed in Table 1. The strain experienced by a LEAF® fiber is virtually identical to that experienced by an SMF-28™ fiber.

TABLE 1

| Degree of Turn of Expansion Element | % Strain (Sample size was 15) |
|---|---|
| 90° | ≧0.053 |
| 180° | 0.138 |
| 270° | 0.212 |
| 360° | ≦0.296 |

The data point for 90° is the minimum percent % for any one sample. Likewise, the data point for 360° is the maximum data point. The data points for 180° and 270° are the respective averages for each point.

The attenuation loss of the fiber is measured at wavelengths of 1550 and 1625 nm as initially wound on the drum and at the four strain increments of the expandable drum using a Photon Kinetics Model 2500 spectral attenuation bench-optical fiber analysis system (manufactured by Photon Kinetics of Beaverton, Oreg.). The five measurements taken at each light wavelength are then plotted to determine the slope of attenuation loss due to strain for each wavelength.

The optical fiber coating systems of the present desirably have a microbending loss at 1550 nm less than [(4.336 dB/km/% strain/μm)(mode field diameter at 1550 nm)−40.9 dB/km/% strain)] as measured by the Expandable Drum test when coated on a large effective area optical fiber. In certain embodiments of the invention, the optical fiber coating system has a microbending loss at 1550 nm between [(4.336 dB/km/% strain/μm)(mode field diameter at 1550 nm)−40.9 dB/km/% strain)] and [(4.336 dB/km/% strain/μm)(mode field diameter at 1550 nm)−39.1 dB/km/% strain)] when coated on a large effective area optical fiber.

The optical fiber coating systems of the present desirably have a microbending loss at 1625 nm less than [(6.564 dB/km/% strain/μm)(mode field diameter at 1550 nm)−60.7 dB/km/% strain)] as measured by the Expandable Drum test when coated on a large effective area optical fiber. In certain embodiments of the invention, the optical fiber coating system has a microbending loss at 1625 nm between [(6.564 dB/km/% strain/μm)(mode field diameter at 1550 nm)−60.7 dB/km/% strain)] and [(4.336 dB/km/% strain/μm)(mode field diameter at 1550 nm)−57.7 dB/km/% strain)] when coated on a large effective area optical fiber.

Another suitable test for measuring the microbend resistance of an optical fiber coating system is the Lateral Load Wire Mesh test. In this test, a lateral load is placed through a wire mesh onto a loop of fiber, and the attenuation as a function of load is measured. In another desirable embodiment of the invention, a coating system for optical fibers includes a primary coating and a secondary coating, wherein when the coating system is applied to a large effective area optical fiber having a mode field diameter of between about 9.64 μm and 9.94 μm at 1550 nm, the coated optical fiber formed thereby has an average microbending loss less than 0.33 dB/m, desirably less than 0.30 dB/m at a wavelength of 1550 nm as measured by the Lateral Load Wire Mesh test.

In the Lateral Load Wire Mesh test, a length of fiber is extended from a light source (a.k.a. launch stage) to a detector stage. A preferred detector stage is a Photon Kinetics (hereinafter "PK") spectral attenuation measurement bench. A suitable device is Model 2500, optical fiber analysis system, from Photon Kinetics of Beaverton, Oreg. The length of fiber must be sufficient to extend from the light source to the measurement bench. The length of fiber also includes a loose predetermined configuration of fiber disposed on a mechanical stress/strain measurement device as described below.

A mechanical measuring device (e.g., an INSTRON®) is used to apply the lateral load on the fiber. The mechanical measuring device is a device capable of controllably applying a load on a material. The force of the load can be controlled and measured along with the rate of loading as a function of time. Further, the deformation imposed on the test sample of material (the piece of fiber) during the course of the loading event can be measured as well. For the tests described in the Examples, an INSTRON® Model No. 4502 was used. This device was manufactured by Instron Corporation of Canton, Mass. Similar devices are available from other manufacturers.

The INSTRON® Model 4502 has a lower steel plate and an upper steel plate. The plates are oriented such that the force imposed by the upper plate on the lower plate is normal to the lower plate. The sample of fiber to be tested is placed on a rubber pad attached to the lower plate. The rubber pad has a Shore A Hardness of 70+/−5. It is essential to ensure that the rubber pad is flat and not marked by grooves of any sort. If necessary, the pad should be replaced or cleaned with isopropyl alcohol.

The fiber is looped approximately 345 degrees around a mandrel having a diameter of 98.5 mm. The fiber may be held in place on the rubber pad by no more than three pieces of thin tape with a maximum width of 3 mm each. A portion of the tape is cut away to prevent fiber crossover at the point where the fiber ends exit the Instron® mechanical testing device.

The mandrel is removed and a number 70 woven wire mesh is placed on top of the fiber loop on the rubber pad, sandwiching the fiber between the rubber pad and the wire mesh. An initial attenuation of the fiber is recorded at 1310 nm, 1550 nm and 1625 nm. A compressive lateral load is applied to the fiber in increments of 10 N. The total lateral load applied is increased incrementally up to 70 N. The transmitted power is recorded for each 10 N incremental increase in lateral load at 1310 nm, 1550 nm and 1625 nm. The reported result is the difference in attenuation (normalized by the length of fiber under test) between the 70 N load and the 30 N load, as given in the equation below:

$$70N\text{--}30N \text{ induced attenuation} = -10 \cdot \log_{10}(P_{70N}/P_{30N})/0.3\,m$$

The 0.3 m length in the equation is the length of a circular arc of fiber about 345 degrees and 98.5 mm in diameter. The Lateral Load Wire Mesh test result is given as an average of five measurements.

In another suitable test for determining microbend resistance of a coating system, a coated optical fiber is put into a ribbon, and the resistance of the ribbon to printing is determined by comparing the loss of a spooled, printed ribbon with the loss of a spooled, unprinted ribbon. Examples of how the printing process can affect conventional ribbons using optical fibers having conventional coating systems are known. For instance, U.S. Pat. No. 6,064,789 discloses that the change in attenuation (i.e., delta attenuation) between printed ribbons and unprinted ribbons can be decreased by using predetermined print pitch (characters/cm) and/or increasing spacing between the printed indicia. Additionally, U.S. Pat. No. 6,360,044 discloses that delta attenuation between printed ribbons and unprinted ribbons can be improved by printing randomly spaced ink shapes on an article used for the transmission of optical signals. Thus, a common manufacturing step such as printing can cause significant delta attenuation depending on printing conditions.

With the known effects of printing on a ribbon, a ribbon optical performance test was designed to subject a ribbon to severe printing conditions. The severe conditions of the ribbon optical performance test serve to quantify optical performance of a coated optical fiber in a given ribbon design, i.e., how susceptible the optical performance of the unit is to stress and/or strains. Additionally, the ribbon optical performance test was also performed on an optical fiber ribbon using a conventional coated optical fiber as a baseline for comparison purposes. The ribbon optical performance test is performed as described below; additional information may be found in U.S. patent application Ser. No. 10/623,219, entitled "FIBER OPTIC ARTICLES, ASSEMBLIES AND CABLES HAVING OPTICAL WAVEGUIDES," listing Lochkovic et al. as inventors, which was filed on Jul. 18, 2003, and is incorporated herein by reference in its entirety.

Figure 3:
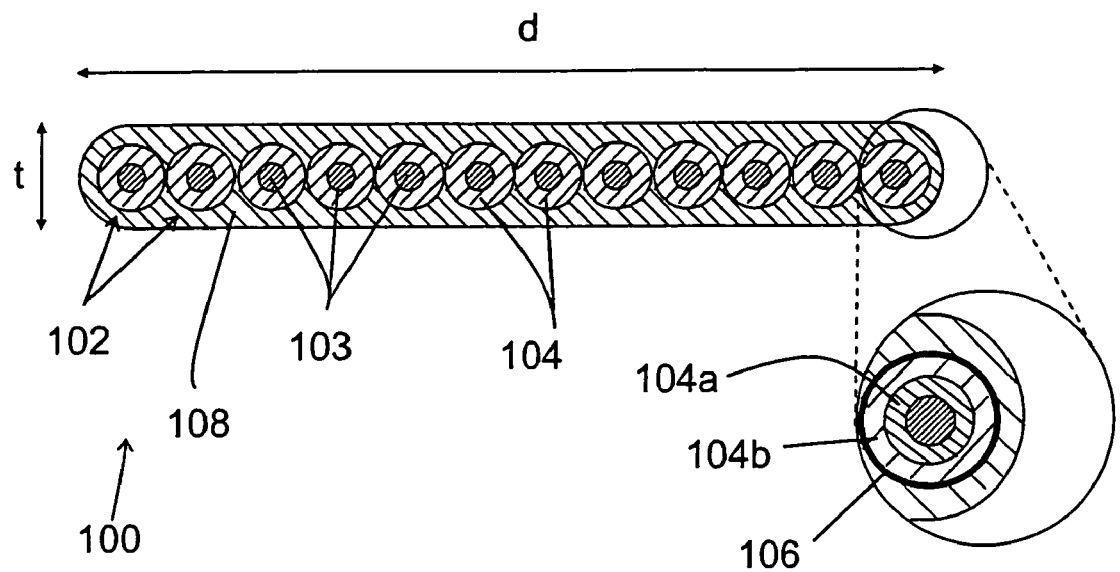
FIG. 3 is a schematic cross-sectional view of a ribbon used in the ribbon optical performance test.

The ribbon geometry used in the ribbon optical performance test is shown in cross-sectional view in FIG. 3. Ribbon 100 includes twelve coated optical fibers 102 held side-by-side in a joining material 108. Each coated optical fiber 102 includes optical fiber 103, a primary coating 104a having an outer diameter of about 190 μm; and a secondary coating 104b having an outer diameter of about 245 μm. Each coated optical fiber 102 has an ink layer 106 formed from LTS ink, available from DSM Desotech of Elgin, Ill. Ink layer 106 has an outer diameter of 258 mm. Ribbon 100 has a thickness t of 0.31 mm and a width w of 3.12 mm. Joining material 108 is Cablelite 950-706, a radiation-curable matrix material available from DSM Desotech Inc. of Elgin, Ill. Cablelite 950-706 has a Young's modulus of 770 MPa, a tensile strength of 28 MPa, and an elongation to break of 31% (all measured by the manufacturer).

Figure 4:
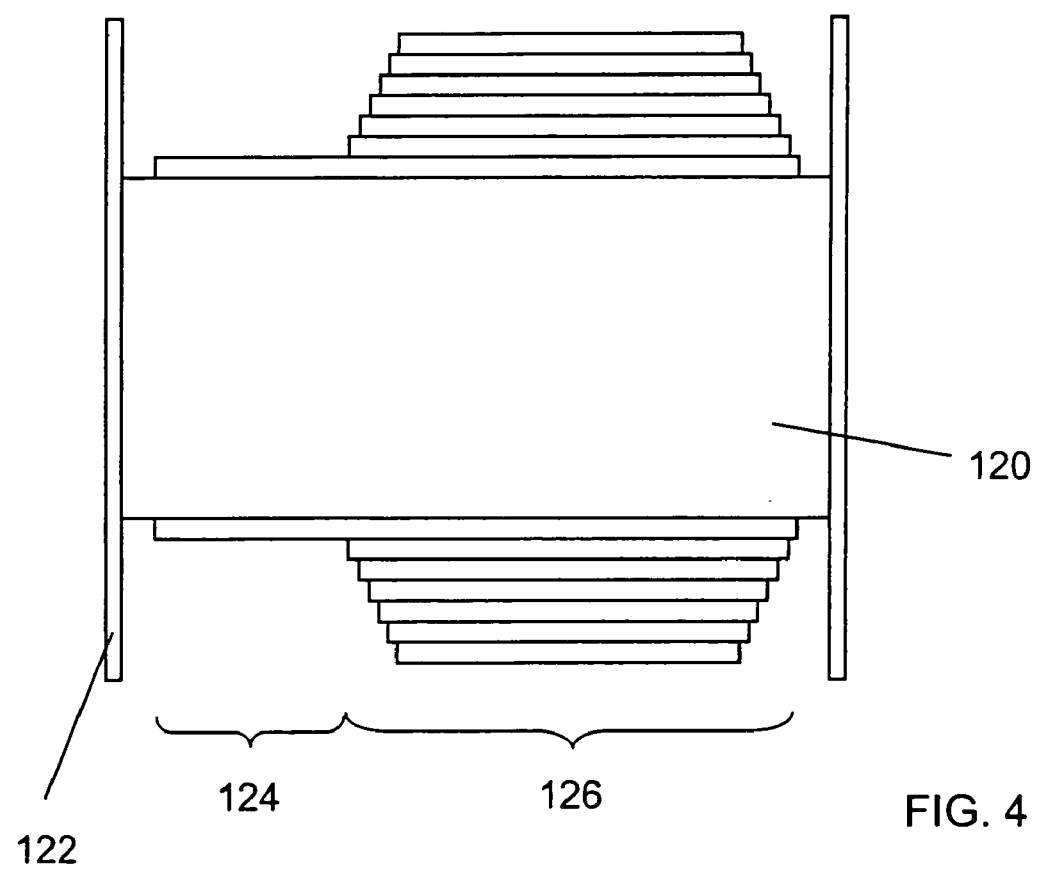
FIG. 4 is a schematic view of a ribbon wound around a reel used in the ribbon optical performance test.

As used herein, the ribbon optical performance test requires that an unprinted ribbon be wound onto a suitable type of reel used throughout the test using similar wind conditions such as wind tension, speed, and wind pitch. Moreover, the test requires a suitable length of ribbon so that the measured signal to noise ratio is not an issue. In the tests described herein, a 1 kilometer sample of ribbon is wound with a tension of 300 grams at a speed of 200 meters per minute with a trapezoidal wind shape. A wound reel is shown in schematic view in FIG. 4. In order to provide a section of ribbon for access to measurement, about 10 m of ribbon (section 124) is wound onto one end of the reel 120, starting about 1" from the reel flange 122 of reel 120. The rest of the ribbon (section 126) is wound with a trapezoidal wind shape, with each layer of wound ribbon being about 1 mm offset from the previous layer. This trapezoidal shape provides a common stress for the ribbon edge fibers, in that it ensures the edge fibers always are resting on a base (i.e., the top of the previous layer), and thus do not "hang over" the previous layer. The reels used in the present test have a hub with a diameter of about 225 mm and about 300 mm between reel flanges. After the ribbon is wound on the reel, the optical attenuation at one or more predetermined reference wavelengths is measured for each optical waveguide of the unprinted ribbon while it is on the reel. Moreover, the unprinted optical attenuation measurement should occur after any transient optical response from manufacturing the ribbon dampens, for example, the experimental measurement results presented were performed within 24±6 hours of the manufacture of ribbon 100.

Figure 5:
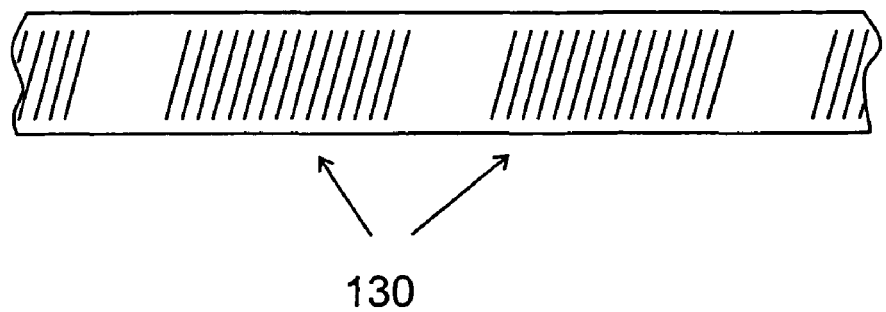
FIGS. 5 and 6 are respectively top and cross-sectional schematic views of a printed ribbon used in the optical performance test.
Figure 6:
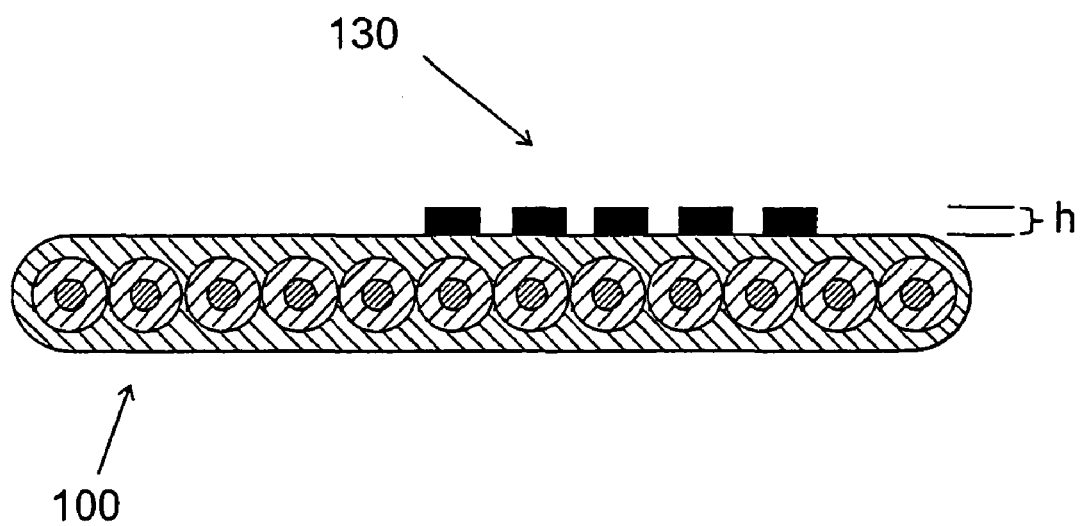

Thereafter, as shown in top view in FIG. 5, and in cross-sectional view in FIG. 6, print indicia 130 having fifteen forward slashes "///////////////" having a print spacing of 50 mm between sets of the print indicia and a print pitch of 5.0 characters/cm was printed on one side of the ribbon 100 using a 201 series Wiedenbach ink jet printer. The ink for the test is Widenbach 12k printing ink, a dye-based ink having a density between about 0.841 g/mL and about 0.850 g/mL and is applied using a 55 μm nozzle so that the print characters have a height h in the range of about 2 μm to about 5 μm. The printer and ink are available from Wiedenbach Apparatebau GMBH of Moos, Germany. Other suitable ink jet printers and inks may be used as long as all of the print conditions (e.g., character height) are similar to the described ribbon optical performance test. After the printing occurs, the printed ribbon is wound onto a reel similar to the first reel with the same wind conditions used before printing. Thereafter, the optical attenuation is measured at the one or more predetermined reference wavelengths after the transient response from printing has damped such as within 24±6 hours after the printing and winding. The change in attenuation can then be calculated for the predetermined reference wavelength and averaged using a suitable number of samples (i.e., twelve coated optical fibers in a ribbon).

Ribbons made using large effective area optical fiber (described hereinabove in with respect to the Expandable Drum test; e.g., LEAF®) are measured at bend sensitive reference wavelengths such as 1550 nm and 1625 nm in the ribbon optical performance test. In one embodiment of the present invention, an optical fiber coating system includes a primary coating and a secondary coating, wherein when a ribbon having twelve large effective area optical fibers coated with the coating system is subjected to the ribbon optical performance test, the average change in attenuation is about 0.020 dB/km or less, desirably about 0.010 dB/km or less, and more desirably about 0.005 dB/km or less at a wavelength of 1550 nm. Desirably, at a wavelength of 1550 μm, the maximum attenuation for any one of the large effective area optical fibers of the ribbon is about 0.040 dB/km or less, more desirably about 0.020 dB/km or less, and most desirably 0.010 dB/km or less. Similarly, the optical fiber coating system according to one embodiment of the invention includes a primary coating and a secondary coating, wherein when a ribbon having twelve optical fibers coated with the coating system is subjected to the ribbon optical performance test, the average change in attenuation is about 0.040 dB/km or less, desirably about 0.025 dB/km or less, and more desirably about 0.010 dB/km or less at a wavelength of 1625 nm. Desirably, at a wavelength of 1625 nm, the maximum attenuation for any one of the large effective area optical fibers of the ribbon is about 0.070 dB/km or less, more desirably about 0.040 dB/km or less, and most desirably 0.015 dB/km or less.

The ribbon optical performance test may also be performed using multi-mode fiber ribbon. In the tests described herein, the multimode fiber is a 125 µm outer diameter optical fiber having a graded index core having a radius of about 25 µm; a refractive index Δ of about 1%; a zero dispersion wavelength between 1300 nm and 1320 nm, a numerical aperture of about 0.2; and a $N_{eff}$ of about 1.481 at 850 nm. A suitable example of such a multi-mode fiber is INFINICOR® 600, available from Corning Incorporated. Ribbons made using multi-mode optical fiber are tested using reference wavelengths of 850 nm or 1300 nm. In one embodiment of the present invention, an optical fiber coating system includes a primary coating and a secondary coating, wherein when a ribbon having twelve multi-mode optical fibers coated with the coating system is subjected to the ribbon optical performance test, the average change in attenuation about 0.20 dB/km or less, desirably about 0.10 dB/km or less, and more desirably about 0.050 dB/km or less at a wavelength of 850 nm. Desirably, at a wavelength of 850 nm, the maximum attenuation for any one of the multi-mode optical fibers of the ribbon is about 0.25 dB/km or less, more desirably about 0.17 dB/km or less, and most desirably 0.10 dB/km or less. Similarly, the optical fiber coating system according to one embodiment of the invention includes a primary coating and a secondary coating, wherein when a ribbon having twelve multi-mode optical fibers coated with the coating system is subjected to the ribbon optical performance test, the average change in attenuation about 0.125 dB/km or less, desirably about 0.50 dB/km or less, and more desirably about 0.020 dB/km or less at a wavelength of 1300 nm. Desirably, at a wavelength of 1300 nm, the maximum attenuation for any one of the multi-mode optical fibers of the ribbon is about 0.25 dB/km or less, more desirably about 0.17 dB/km or less, and most desirably 0.10 dB/km or less.

In the multi-mode ribbon optical performance test described above, the optical fiber coating systems of the present invention have a low degree of fiber-to-fiber variability. According to one embodiment of the present invention, when a ribbon having twelve multi-mode optical fibers coated with the coating system of the present invention is subjected to the ribbon optical performance test at a wavelength of 850 nm, the difference between the maximum single fiber change in attenuation and the minimum single fiber change in attenuation is about 0.5 dB/km or less, desirably about 0.3 dB/km or less, and more desirably about 0.2 dB/km or less.

One frequent environmental change experienced by an optical fiber during service is a change in temperature. Conventional optical fibers suffer from an increase in attenuation as temperatures decrease. The optical fiber coating systems of the present invention provide a high degree of low temperature resistance to coated optical fibers. The low temperature resistance of an optical fiber coating system can be measured by measuring the change in attenuation due to temperature cycling of a ribbon of optical fibers coated with the coating system.

A suitable test for temperature performance of an optical fiber coating system is the ribbon temperature performance test, as described hereinbelow. The coating system is coated onto optical fibers (either large effective area optical fibers or multi-mode optical fibers, as described above), and the optical fibers are formed into ribbons as described above. The ribbons are then wound onto reels as described above in the ribbon optical performance test. The wound reel is placed into a temperature chamber, and the attenuations of the coated optical fibers of the ribbon are measured while the temperature is cycled. The wound reel is placed in the thermal chamber at 23° C., and is allowed to reach a steady state, so that a baseline attenuation measurement can be made for each optical fiber of the ribbon at a desired wavelength (e.g., 1550 nm for large effective area fibers, 850 nm for multi-mode fibers). The temperature is ramped down to −40° C. over a four hour period, and the temperature is held for four hours. At the end of the four hour hold, a first −40° C. attenuation measurement (for each optical fiber) is taken. The temperature is then ramped to 70° C. over a four hour period, then held for four hours. At the end of this four hour hold, a first 70° C. attenuation measurement is taken. The temperature is then lowered to −40° C. over four hours, held for four hours, raised to 70° C. over four hours, and held for four hours, with second −40° C. and second 70° C. attenuation measurements taken at the end of the four hour holds. The temperature is then raised to 85° C. over a four hour period and held for four days, after which an 85° C. attenuation measurement is taken. The temperature is ramped back to 23° C. over four hours, and two more −40° C. to 70° C. temperature cycles are performed as described above, with third and fourth −40° C. and 70° C. attenuation measurements being taken after each four hour hold. The temperature is then brought to 23° C. over four hours for a final attenuation measurement. Delta attenuations for each measurement are calculated by subtracting the baseline attenuation measurement from the attenuation measurement.

The optical fiber coating systems of the present invention have good performance in the ribbon temperature performance test. For example, according to one embodiment of the invention, an optical fiber coating system includes a primary coating; and a secondary coating, wherein when a ribbon having twelve large effective area optical fibers coated with the coating system is subjected to the ribbon temperature performance test at a wavelength of 1550 nm, the maximum delta attenuation for the first −40° C. attenuation measurement is about 0.015 dB/km or less, desirably about 0.010 dB/km or less, more desirably about 0.005 or less. As used in this test, the maximum delta attenuation is the largest delta attenuation out of the twelve fibers of the ribbon. Desirably, the maximum delta attenuation for each of the first, second, third and fourth −40° C. attenuation measurement is about 0.015 dB/km or less, more desirably about 0.010 dB/km or less.

The invention has been described hereinabove as a coating system for optical fibers. As the skilled artisan, will readily appreciate, the present invention also includes optical fibers coated with the above-described coating system. For example, another aspect of the invention relates to a coated optical fiber including an optical fiber including a core and a cladding; and a coating system as described hereinabove surrounding the optical fiber.

EXAMPLES

The present invention is further described by the following non-limiting examples.

Example 1

Primary curable compositions 1-7 were formulated using a high-speed mixer in an appropriate container heated to 70° C. with a heating band or heating mantle. In each case, the components were weighed into the container using a balance and allowed to mix until the solid components were thoroughly dissolved and the mixture appeared homogeneous. Curable compositions are formulated such that the amounts of oligomer, monomer, and photoinitiator total 100 wt %; other additives such as antioxidant are added to the total mixture in units of pph. BR3741 is an oligomer from Bomar Specialties. PHOTOMER 4003 is a monomer available from Cognis. TONE M-100 is a monomer available from Dow Chemical. IRGACURE 819 and IRGACURE 184 are photoinitiators available from Ciba Specialty Chemical. (3-Acryloxypropyl)trimethoxysilane is an adhesion promoter available from Gelest Incorporated. IRGANOX 1035 is an antioxidant available from Ciba. Pentaerythritol tetrakis(3-mercaptopropionate) is a strength additive available from Aldrich. UVITEX OB is an optical brightener available from Ciba. The oligomer and monomer(s) were blended together for at least one hour at 70° C. Photoinitiator(s) and antioxidant were then added, and blending was continued for one hour. The strength additive was then added, and blending was continued for 30 minutes. Finally, the adhesion promoter was added, and blending was continued for 30 minutes. The components used to formulate primary curable compositions 1-7 are detailed below in Table 2.

TABLE 2

| Component | Primary Curable Composition | | | | | | |
|---|---|---|---|---|---|---|---|
| BR 3741 (wt %) | 2 | 2 | 2 | 2 | 2 | 2 | 2 |
| PHOTOMER 4003 (wt %) | 5 | 5 | 5 | 1.5 | 1.5 | 5 | 5 |
| TONE M-100 (wt %) | 0 | 0 | | | | 0 | 0 |
| IRGACURE 819 (wt %) | .5 | .5 | .5 | .5 | .5 | .5 | .5 |
| IRGACURE 184 (wt %) | .5 | .5 | .5 | | | .5 | .5 |
| (3-acryloxypropyl)-trimethoxysilane (pph) | | | | | | .75 | .1 |
| IRGANOX 1035 (pph) | | | | | | | |
| pentaerythritol tetrakis(3-mercaptoproprionate) (pph) | .032 | .032 | .032 | .032 | .032 | .032 | |
| UVITEX OB (pph) | | | | | .05 | | |

Primary curable compositions 1-7 were cured into films for testing of mechanical properties. Wet films were cast on silicone release paper with the aid of a draw-down box having an about 0.005" gap thickness. Films were cured using a Fusion Systems UV curing apparatus with a 600 W/in D-bulb (50% power, 10 ft/min belt speed, nitrogen purge) to yield primary coatings 1-7 in film form. Cured film thickness was between about 0.003" and 0.004".

The films were allowed to age (23° C., 50% relative humidity) for at least 16 hours prior to testing. Film samples were cut to a specified length and width (about 15 cm×about 1.3 cm) and talced to allow easy handling. Young's modulus, tensile strength at break, and elongation at break were measured using an MTS Sintech tensile tester. Films were tested at an elongation rate of 2.5 cm/min starting from an initial jaw separation of 5.1 cm. Glass transition temperatures of the cured films were determined by determining the peak of the tan δ curves measured on a Seiko-5600 DMS in tension at a frequency of 1 Hz. Thermal and mechanical properties (tested in accordance with ASTM 82-997) of the cured films are reported in Table 3, below, in which "ND" means not determined.

TABLE 3

| Primary Coating | Young's modulus (MPa) | Tensile Strength (MPa) | elongation at break | $T_g$ (° C.) |
|---|---|---|---|---|
| 1 | 0.70 | 0.61 | 144% | −37 |
| 2 | 0.71 | 0.68 | 141% | −37 |
| 3 | 0.78 | 1.11 | 170% | −36 |
| 4 | 0.73 | 0.57 | 144% | −36 |
| 5 | 0.84 | 0.86 | 147% | ND |
| 6 | 0.89 | 0.61 | 136% | ND |
| 7 | 0.84 | 0.58 | 140% | ND |

Example 2

Secondary curable compositions 8-9 were formulated in a jacketed beaker heated to 70° C. using a high-speed mixer. In each case, the components were weighed into the jacketed beaker using a balance and allowed to mix until the solid components were thoroughly dissolved and the mixture appeared homogeneous. Curable compositions are formulated such that the amounts of oligomer, monomer, and photoinitiator total 100 wt %; other additives such as antioxidant are added to the total mixture in units of pph. KWS 4131 is an oligomer from Bomar Specialties. PHOTOMER 4028 and PHOTOMER 3016 are monomers available from Cognis. LUCIRIN TPO is a photoinitiator available from BASF. The components used to formulate secondary curable compositions 8-9 are detailed in Table 4.

TABLE 4

| | Secondary Curable Composition | |
|---|---|---|
| Component | 8 | 9 |
| KWS 4131 (wt %) | 10 | 10 |
| PHOTOMER 4028 (wt %) | 82 | 82 |
| PHOTOMER 3016 (wt %) | 5 | 5 |
| IRGACURE 819 (wt %) | 1.5 | 0 |
| IRGACURE 184 (wt %) | 1.5 | 1.5 |
| LUCIRIN TPO (wt %) | 0 | 1.5 |
| IRGANOX 1035 (pph) | 0.5 | 0.5 |

Secondary curable compositions 8-9 were used to made rod samples for tensile testing. Rods were prepared by injecting the curable compositions int TEFLON tubing having an inner diameter of about 0.025". The samples were cured using a Fusion D bulb at a dose of about 2.6 J/cm² (measured over a wavelength range of 225-424 nm by a Light Bug model IL390 from International Light). After curing, the TEFLON tubing was stripped away, leaving rod samples about 0.0225" in diameter (after shrinkage due to cure). The cured rods were allowed to condition overnight in a laboratory having a controlled temperature of 23° C. and a controlled relative humidity of 50%. Young's modulus, tensile strength, elongation to break, $K_{1C}$ and ductility of the secondary coating materials were measured as described above, and are reported in Table 5.

TABLE 5

| Secondary Coating | Tensile strength (MPa) | % Elongation | Young's Modulus (MPa) | $K_{1C}$ (MPa·m$^{1/2}$) | Ductility (μm) |
|---|---|---|---|---|---|
| 8 | 44.02 | 29.4 | 1564 | 0.75 | 320 |
| 9 | 53.12 | 39.4 | 1658 | 0.75 | 335 |

Example 3

Coated optical fibers 1 and 2 were prepared by coating large effective area optical fibers (LEAF®, from Corning Incorporated) with a coating system of the present invention including primary coating 1 and secondary coating 8. Expandable Drum microbending test results are given in Table 6. LEAF® fiber coated with conventional coating systems typically has values of greater than 1.4 dB/km/% strain at 1550 nm in the Expandable Drum test.

TABLE 6

| Coated Optical Fiber | MFD (μm) @1550 nm | Slope Loss Due To Strain dB/km/% strain | | |
|---|---|---|---|---|
| | | 1310 nm | 1550 nm | 1625 nm |
| 1 | 9.64 | −0.008 | 0.211 | 0.732 |
| 2 | 9.94 | 0.018 | 0.484 | 0.960 |

Example 4

Coated optical fibers 3 and 4 were prepared by depositing primary coatings 1 and 3, respectively, and secondary coating 7 on large effective area optical fiber (LEAF®). For each coated optical fiber, a twelve fiber ribbon was made as described above using methods familiar to the skilled artisan. The ribbon optical performance test described hereinabove was performed on the ribbons. Data is given as averages of all twelve fibers in the ribbon. The ribbon containing coated optical fiber 3 exhibited an average change in attenuation of −0.003 dB/km at 1550 nm; and −0.004 dB/km at 1625 nm, with maximum values of 0.005 dB/km at 1550 nm and 0.005 dB/km at 1625 nm. The ribbon containing coated optical fiber 4 had virtually identical performance. A comparison ribbon made using a conventionally coated LEAF® fiber exhibited an average change in attenuation of 0.078 dB/km at 1550 nm; and 0.105 dB/km at 1625 nm, with maximum values of 0.147 dB/km at 1550 nm and 0.175 dB/km at 1625 nm.

The ribbon temperature performance test described hereinabove was performed on the ribbon having coated optical fiber 3 and the ribbon made with conventionally coated LEAF®. The maximum delta attenuation for each −40° C. attenuation measurement is shown in Table 7.

TABLE 7

| Ribbon | First −40° C. | Second −40° C. | Third −40° C. | Fourth −40° C. |
|---|---|---|---|---|
| Conventionally coated LEAF ® | 0.0285 dB/km | 0.058 dB/km | 0.0615 dB/km | 0.047 dB/km |
| Coated optical fiber 3 | −0.0025 dB/km | −0.0005 dB/km | −0.0005 dB/km | −0.0005 dB/km |

Example 5

Coated optical fiber 5 was prepared by depositing primary coating 1 and secondary coating 8 on a multi-mode fiber (INFINICOR® 600). A twelve fiber ribbon was made as described above using methods familiar to the skilled artisan. The ribbon optical performance test described hereinabove was performed on the ribbon. Data is given as averages of all twelve fibers in the ribbon. The ribbon containing coated optical fiber 5 exhibited an average change in attenuation of 0.015 dB/km at 850 nm; and 0.006 dB/km at 1300 nm, with maximum values of 0.090 dB/km at 850 nm and 0.077 dB/km at 1300 nm. A comparison ribbon made using a conventionally coated INFINICOR® 600 fiber exhibited an average change in attenuation of 0.310 dB/km at 850 nm; and 0.270 dB/km at 1300 nm, with maximum values of 0.919 dB/km at 850 nm and 0.760 dB/km at 1300 nm.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A coated optical fiber comprising:
   an optical fiber including a core and a cladding;
   a primary coating that surrounds the optical fiber, said primary coating having a tensile strength greater than about 0.5 MPa and a Young's modulus at 23° C. of about 1.3 MPa or less; and
   a secondary coating that surrounds the primary coating, said secondary coating having a Young's modulus at 23° C. greater than about 900 MPa, a ductility of about 300 μm or greater, and fracture toughness a $K_{1c}$ of about 0.7 MPa·m$^{1/2}$ or greater.

2. The coated optical fiber of claim 1 wherein the secondary coating has a ductility of at least about 370 μm.

3. The coated optical fiber of claim 1, wherein the secondary coating is the cured product of a secondary curable composition having an oligomer content of less than about 15 wt %.

4. The coated optical fiber of claim 1, wherein the primary coating has a Young's modulus of about 1.15 MPa or less.

5. The coated optical fiber of claim 1, wherein the primary coating is the cured product of a primary curable composition including between about 0.1 and about 25 wt % of a hydroxy-functional monomer.

6. The coated optical fiber of claim 1, wherein when a ribbon having twelve of said optical fibers is subjected to a ribbon optical performance test at a wavelength of 1550 nm, the average change in attenuation is about 0.020 dB/km or less.

7. The coated optical fiber of claim 1, wherein when a ribbon having twelve of said optical fibers is subjected to the ribbon optical performance test at a wavelength of 1550 nm, the average change in attenuation is about 0.010 dB/km or less.

8. The coated optical fiber of claim 1, wherein when a ribbon having twelve of said optical fibers is subjected to the ribbon optical performance test at a wavelength of 1625 nm, the average change in attenuation is about 0.040 dB/km or less.

9. The coated optical fiber of claim 1, wherein when a ribbon having twelve of said optical fibers is subjected to the ribbon optical performance test at a wavelength of 1550 nm, the maximum attenuation for any one of the optical fibers of the ribbon is about 0.040 dB/km or less.

10. The coated optical fiber of claim 1, wherein said optical fibers are multi-mode optical fibers, and when a ribbon having twelve of said multi-mode optical fibers is subjected to the ribbon optical performance test at a wavelength of 850 nm, the average change in attenuation is about 0.20 dB/km or less.

11. The coated optical fiber of claim 1, wherein said optical fibers are multi-mode optical fibers, and when a ribbon having twelve of said multi-mode optical fibers is subjected to the ribbon optical performance test at a wavelength of 850 nm, the maximum attenuation for any one of the optical fibers of the ribbon is about 0.25 dB/km or less.

12. The coated optical fiber of claim 1, wherein said optical fibers are multi-mode optical fibers, and when a ribbon having twelve of said multi-mode optical fibers is subjected to the ribbon optical performance test at a wavelength of 850 nm, the difference between the maximum single fiber change in attenuation and the minimum single fiber change in attenuation is about 0.5 dB/km or less.

13. The coated optical fiber of claim 1, wherein said optical fibers are multi-mode optical fibers, and when a ribbon having twelve of said multi-mode optical fibers is subjected to the ribbon optical performance test at a wavelength of 1300 nm, the average change in attenuation is about 0.125 dB/km or less.

14. The coated optical fiber of claim 1, wherein when the coated optical fiber-has a mode field diameter of between about 9.64 μm and 9.94 μm at 1550 nm, the coated optical fiber has an Expandable Drum test microbending loss less than 0.9 dB/km/% strain at a wavelength of 1550 nm.

15. The coated optical fiber of claim 1, wherein when the coated optical fiber-has a mode field diameter of between about 9.64 μm and 9.94 μm at 1550 nm, the coated optical fiber has a microbending loss less than 2.3 dB/km/% strain at a wavelength of 1625 nm as measured by the Expandable Drum test.

16. The coated optical fiber of claim 1, wherein when the coated optical fiber-has a mode field diameter of between about 9.64 μm and 9.94 μm at 1550 nm, the coated optical fiber has a microbending loss at 1550 nm less than [(4.336 dB/km/% strain/μm)(mode field diameter at 1550 nm)−40.9 dB/km/% strain)] as measured by the Expandable Drum test.

* * * * *